United States Patent
Huang

(10) Patent No.: US 10,299,330 B1
(45) Date of Patent: May 21, 2019

(54) CURRENT REGULATOR

(71) Applicant: Dialog Semiconductor (UK) Limited, London (GB)

(72) Inventor: Chi-Chia Huang, Hsinchu (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/869,577

(22) Filed: Jan. 12, 2018

(51) Int. Cl.
*H05B 33/08* (2006.01)

(52) U.S. Cl.
CPC ..... *H05B 33/0842* (2013.01); *H05B 33/0812* (2013.01); *H05B 33/0824* (2013.01)

(58) Field of Classification Search
CPC .... H05B 37/02; H05B 33/08; H05B 33/0812; H05B 33/0815; H05B 33/0824; H05B 33/0842; H05B 33/0845; H05B 33/0854
USPC ........ 315/151, 185 R, 209 R, 291, 294, 307, 315/308, 312
See application file for complete search history.

(56) References Cited

U.S. PATENT DOCUMENTS

| | | | |
|---|---|---|---|
| 7,012,476 B2 * | 3/2006 | Ogiso | H03B 5/04 331/107 A |
| 8,766,617 B2 * | 7/2014 | Wan | H02M 3/1588 323/285 |

OTHER PUBLICATIONS

"1MHz PWM Boost Converter for 1.5A White LED Camera Flash," 2007 Maxim Integrated Products,19-3783, MAX8607, Rev 1; 2/07, pp. 1-10.
"TPS6105x 1.2-A High-Power White Led Driver 2-MHz Synchronous Boost Converter With I²C Compatible Interface," TPS61050, TPS61052, Texas Instruments, SLUS525A—Mar. 2007, 49 pgs.

* cited by examiner

*Primary Examiner* — Jimmy T Vu
(74) *Attorney, Agent, or Firm* — Saile Ackerman LLC; Stephen B. Ackerman

(57) ABSTRACT

A current regulator for a flash LED driver is presented. An apparatus and method for a current regulator that provides a current and exhibits good noise rejection is presented. A current regulator for regulating a current through a circuit element contains a first node at a first voltage, the current through the circuit element being dependent on the first voltage and a positive feedback loop coupled to the first node, The positive feedback loop is arranged to provide a signal to remove a voltage shift from the first voltage in response to a decrease or increase of the first voltage by the voltage shift.

20 Claims, 19 Drawing Sheets

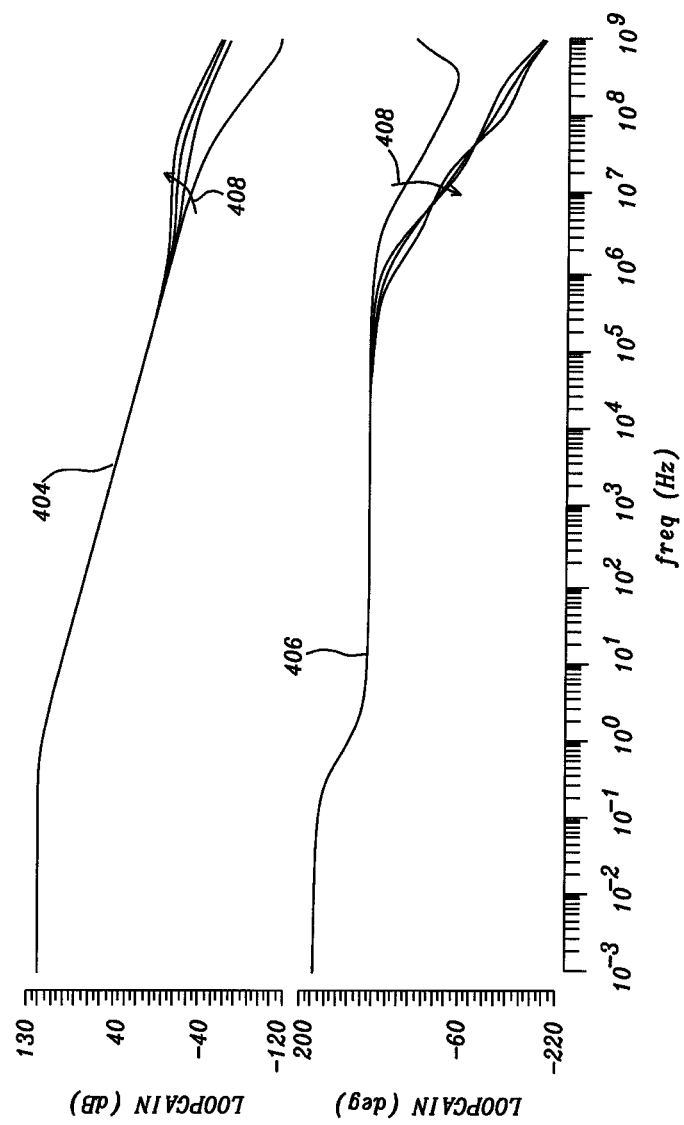

CURRENT REGULATOR

TECHNICAL FIELD

The present disclosure relates to apparatus and methods for a current regulator that provides a current and exhibits good noise rejection. In particular, this disclosure relates to a current regulator for a flash LED driver.

BACKGROUND

A current regulator is used to provide a constant current through a circuit element, such as a light emitting diode (LED). When the current regulator is arranged to provide a constant current through an LED it may be referred as an LED driver. In such applications the LED driver can maintain a constant current despite variations in a forward voltage of the LED. A particular type of LED driver is a flash LED driver that may be used to provide a high current through the LED for a short duration. This can be used to generate a bright flash for a camera.

FIG. 1(a) and FIG. 1(b) show schematics of prior art implementations of flash LED drivers. In FIG. 1(a) there is a LED current regulator 10, comprising a transistor 12, for providing a constant current to a LED coupled to an LED pin 14. A boost regulator is used to generate a supply voltage VOUT at a supply pin 16. The supply voltage VOUT is regulated such that a voltage at the LED pin 14 is the minimum voltage at which the transistor 12 can operate, whilst still providing a constant current. A forward voltage of the LED is a voltage difference between the supply pin 16 and the LED pin 14, which may be in the range of 2.9V to 4.5V. The supply voltage VOUT is dynamically adjusted based on the forward voltage of the LED and therefore power dissipation on the transistor 12 can be minimised. FIG. 1(b) shows a different implementation of a current regulator in the form of a low dropout (LDO) regulator 18. A boost regulator is used to generate a supply voltage VOUT at a supply pin 20.

A current regulator may be implemented in a system that uses a supply voltage that is shared with other functions. Another function may include the supply voltage being used for a USB On-The-Go (OTG) system. In such a system the supply voltage may vary and is susceptible to noise.

SUMMARY

It is desirable to provide a current regulator for implementation in a system where the supply voltage may vary and/or may be susceptible to noise.

According to an aspect of the disclosure there is provided a current regulator for regulating a current through a circuit element, comprising: a first node at a first voltage, the current through the circuit element being dependent on the first voltage; a positive feedback loop coupled to the first node; wherein the positive feedback loop is arranged to provide a signal to remove a voltage shift from the first voltage in response to a decrease or increase of the first voltage by the voltage shift.

Optionally, the positive feedback loop comprises a voltage to current converter that is coupled to the first node at a first input and receives the first voltage at the first input, the voltage to current converter generates the signal at an output, wherein the signal is a recovery current.

Optionally, the output of the voltage to current converter is coupled to a second input of the voltage to current converter.

Optionally, the current regulator comprises a transistor with a gate at a gate voltage, wherein the first voltage at the first node is dependent on the gate voltage of the transistor.

Optionally, the signal is received at the gate of the transistor, and upon receiving the signal, the gate voltage changes and the voltage shift is removed from the first voltage.

Optionally, the current regulator comprises a resistive element coupled in series with the transistor at the first node.

Optionally, the circuit element is a light emitting diode.

Optionally, the circuit element has a first terminal coupled to a supply voltage and a second terminal coupled to the transistor.

Optionally, the current regulator comprises a main regulation loop, the main regulation loop comprising an amplifier with a first input coupled to a reference voltage, a second input coupled to the first node and an output coupled to the gate of the transistor.

Optionally, the voltage shift is propagated to the first voltage from the supply voltage.

Optionally, the transistor operates in a linear region.

Optionally, the recovery current is tunable.

Optionally, the amplifier is arranged to stabilise the positive feedback loop.

Optionally, the amplifier comprises a compensation and couple network arranged to stabilise the positive feedback loop.

Optionally, the amplifier comprises a capacitor and a second transistor arranged to stabilise the positive feedback loop.

Optionally, the current regulator comprises a switch and clamp network, wherein the switch and clamp network is arranged to enable tuning of the recovery current.

BRIEF DESCRIPTION OF THE DRAWINGS

The disclosure is described in further detail below by way of example and with reference to the accompanying drawings, in which:

FIG. 5(b) is a simulated Bode plot of the current regulator of FIG. 5(a);

DESCRIPTION

Figure 1A:
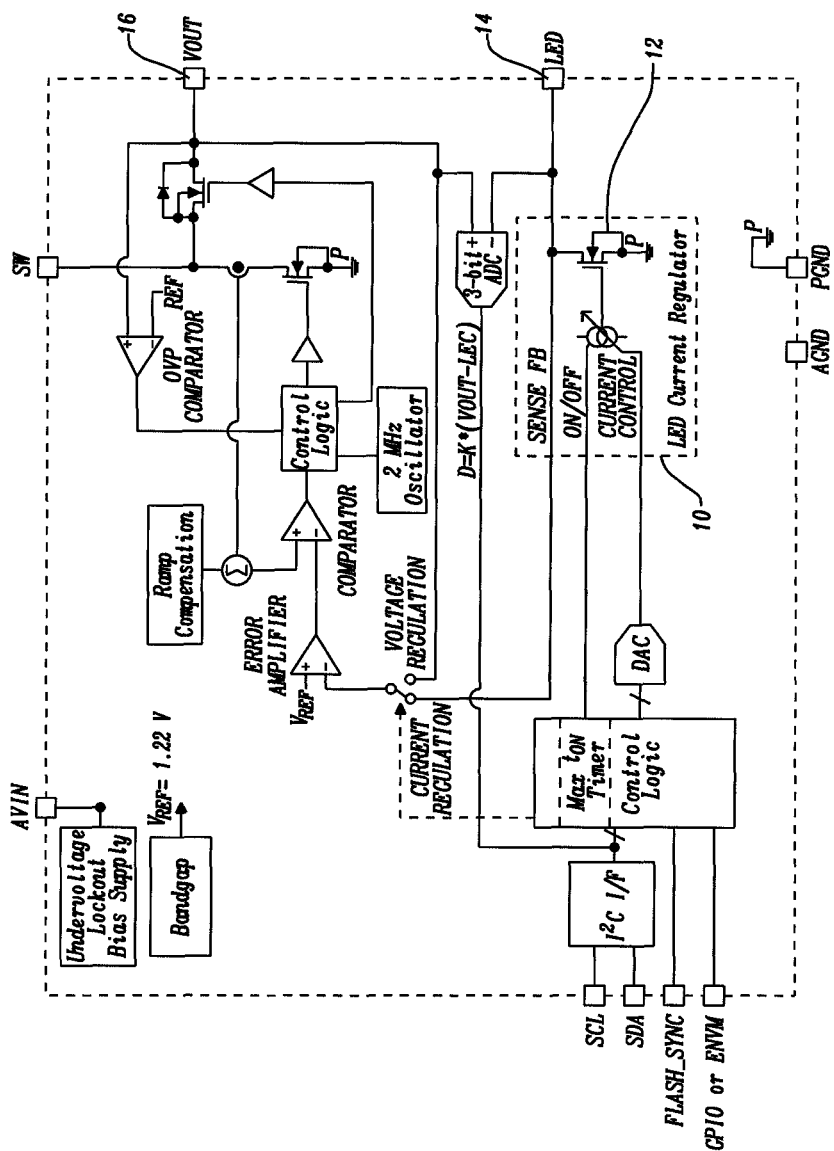
FIG. 1(a) is a schematic diagram of a first prior art implementation of a flash LED driver.
Figure 1B:
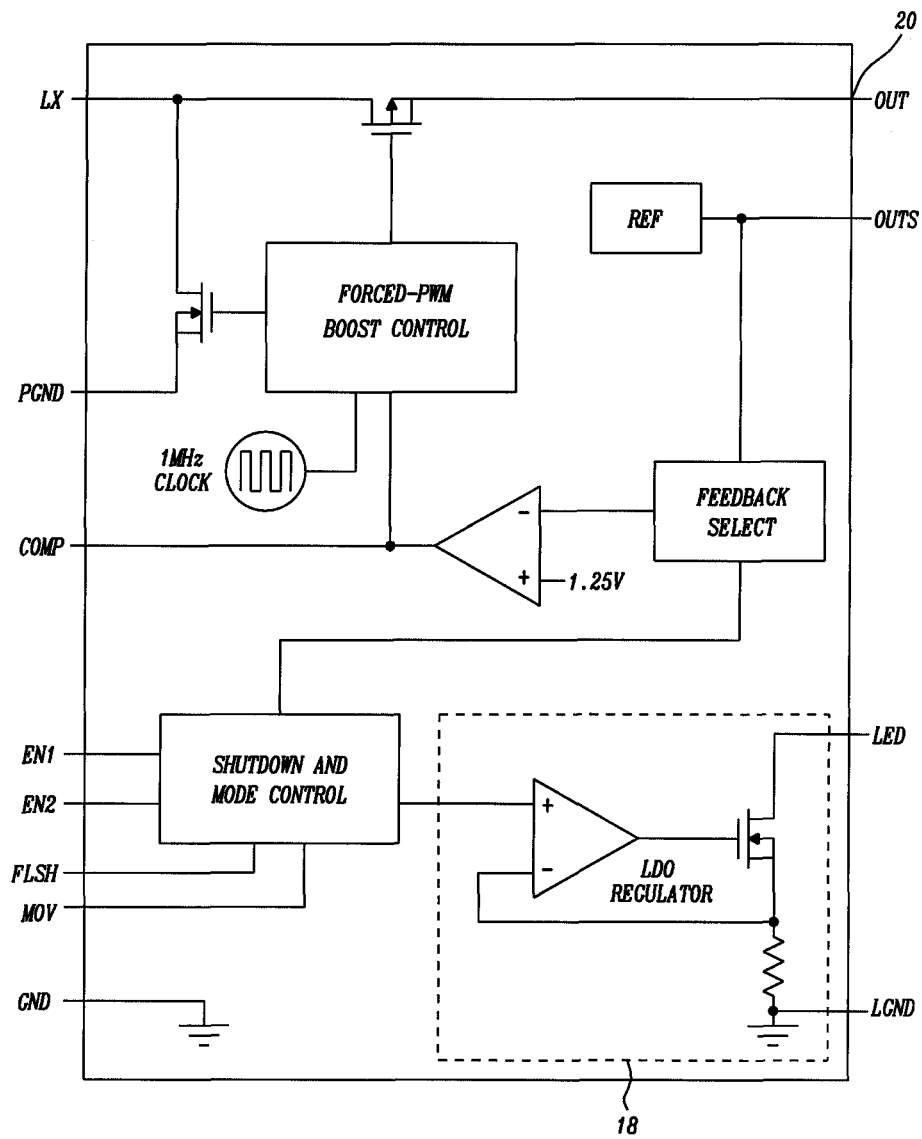
FIG. 1(b) is a schematic diagram of a second prior art implementation of a flash LED driver in accordance with the prior art.
Figure 2:
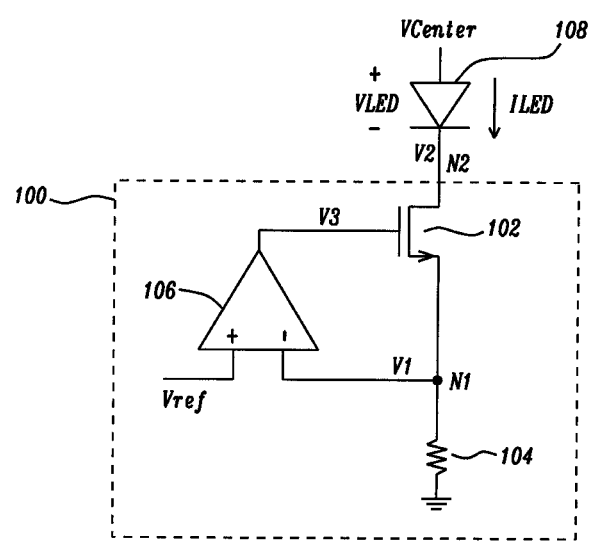
FIG. 2 is a schematic diagram of a low dropout (LDO) regulator in accordance with the prior art.

FIG. 2 shows a schematic of a low dropout (LDO) regulator 100, which is a type of current regulator, arranged to operate as a flash light emitting diode (LED) driver. The LDO regulator 100 of FIG. 2 is equivalent to the LDO regulator 18 of FIG. 1(b). The LDO regulator 100 comprises a regulation loop. The regulation loop comprises a transistor 102, a resistive element, implemented here as a resistor 104, and an amplifier 106. The transistor 102 has a source coupled to a first terminal of the resistor 104 at a first node N1. The amplifier 106 has a first input coupled to a reference voltage Vref, and a second input coupled to the first node N1. The amplifier 106 has an output coupled to a gate of the transistor 102. An LED 108 has a negative terminal coupled to a drain of the transistor 102 at a second node N2 and a positive terminal coupled to a supply voltage VCenter. The first node N1 is at a first voltage V1, the drain of the transistor 102 is at a second voltage V2 and the gate of the transistor 102 is at a gate voltage V3. The transistor 102 is an NMOS transistor. There is an LED voltage VLED across the LED 108 and an LED current ILED flows through the LED 108. Under a steady state operation, the first voltage V1 is equal to the reference voltage Vref, and the LED current ILED can be expressed as V1/R1, where V1 is the first voltage and R1 is a resistance of the resistor 104.

Figure 3:
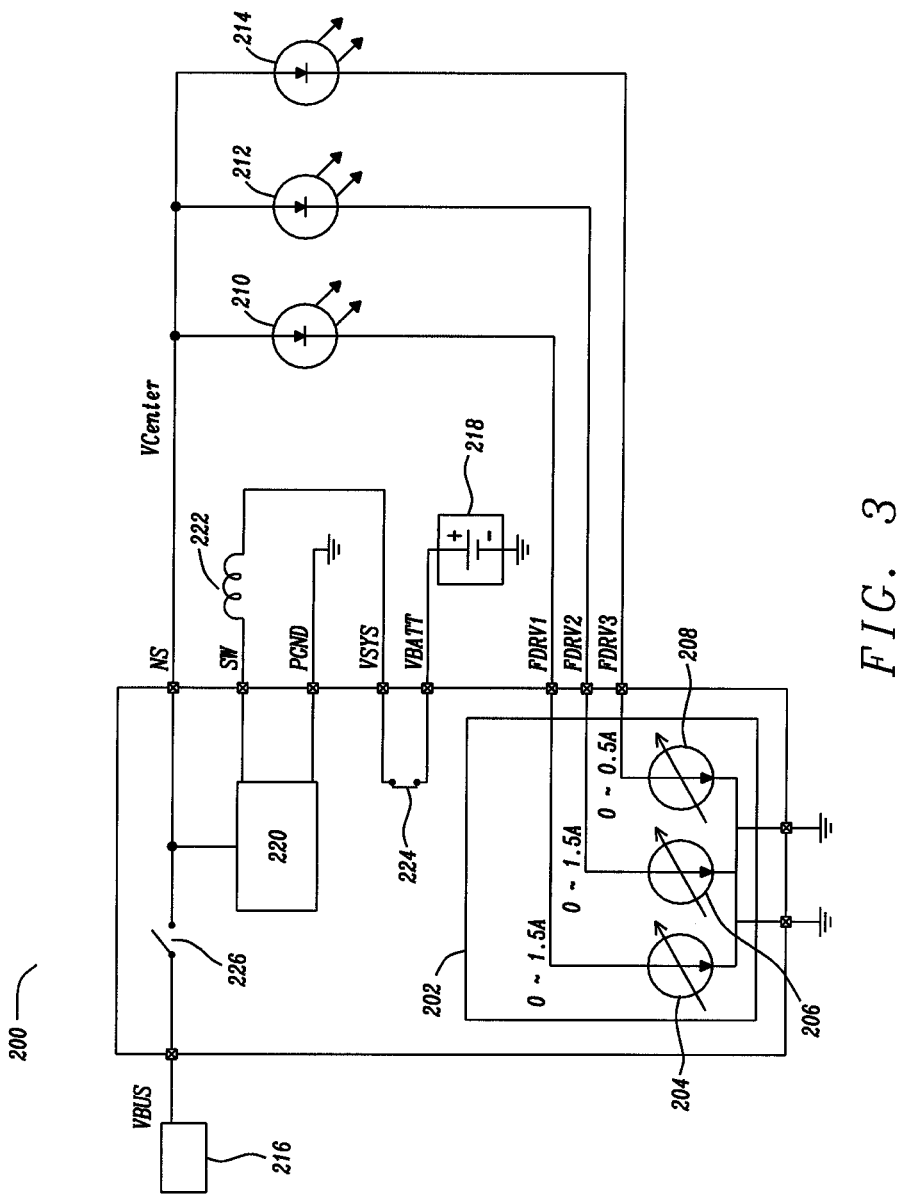
FIG. 3 is a schematic diagram of a light emitting diode (LED) system.

FIG. 3 shows a schematic of an LED system 200 comprising a flash driver 202 comprising a first variable current source 204, a second variable current source 206 and a third variable current source 208 arranged to regulate current through a first LED 210, a second LED 212 and a third LED 214, respectively. The supply voltage VCenter of the LED system 200 may be generated externally by an external voltage source 216 that provides an external voltage VBUS, or may be generated internally by a battery 218 that has a battery voltage VBATT, a charger 220 arranged to provide a reverse boosting function and an inductor 222.

A first terminal of the battery 218 is coupled to a first terminal of the inductor 222 via a battery switch 224 and a switch terminal VSYS. A second terminal of the battery 218 is coupled to ground. A second terminal of the inductor 222 is coupled to the charger 220 at a first charger terminal SW. The charger 220 has a second charger terminal PGND coupled to ground. The charger 220 has a third terminal coupled to a supply node NS. The external voltage source 216 is coupled to the supply node NS via an input voltage switch 226. When the supply voltage VCenter is provided by the external voltage VBUS, the input voltage switch 226 is closed and the battery switch 224 is open. When the supply voltage VCenter is generated internally, the battery switch 224 is closed and the input voltage switch 226 is open.

The supply node NS is coupled to a first terminal of the first LED 210, a first terminal of the second LED 212, and a first terminal of the third LED 214. A second terminal of the first LED 210 is coupled to a first terminal of the first variable current source 204 via a first flash drive node FDRV1. A second terminal of the second LED 212 is coupled to a first terminal of the second variable current source 206 via a second flash drive node FDRV2. A second terminal of the third LED 214 is coupled to a first terminal of the third variable current source 208 via a third flash drive node FDRV3. A second terminal of the first variable current source 204, a second terminal of the second variable current source 206 and a second terminal of the third variable current source 208 are coupled to ground.

The LDO regulator 100 shown in FIG. 2 may be used in the LED system 200 of FIG. 3. Each of the three variable current sources 204, 206, 208 may be provided by the LDO regulator 100. In such an implementation, the LED system 200 would comprise three LDO regulators 100, each of the type shown in FIG. 2.

In implementing the LDO regulator 100 of the type shown in FIG. 2 as the first variable current source 204, the second node N2 may be coupled to the first flash drive node FDRV1. In implementing the LDO regulator 100 of the type shown in FIG. 2 as the second variable current source 206, the second node N2 may be coupled to the second flash drive node FDRV2. In implementing the LDO regulator 100 of the type shown in FIG. 2 as the third variable current source 208, the second node N2 102 may be coupled to the third flash drive node FDRV3.

The LDO regulator 100 provides a maximum value for the LED voltage VLED. When the LED voltage VLED is below the maximum value, there is a risk that the transistor 102 may be fully turned on as the gate voltage V3 reaches the supply voltage VCenter and the LDO regulator 100 loses its regulation capability such that it is unable to provide a constant current.

For example, the supply voltage VCenter minus the LED voltage VLED may have a maximum value of 420 mV. To resolve the above efficiency and regulation concerns the supply voltage VCenter minus the LED voltage VLED may be designed to be a value slightly larger than 420 mV, for example 450 mV. The 450 mV must be shared by the transistor 102 and the resistor 104, for example by providing 225 mV to the transistor 102 and 225 mV to the resistor 104.

In a linear region, the transistor 102 exhibits poor noise rejection against noise that is present at the second node N2. If the supply voltage VCenter is not used to provide additional functions, it is possible to assume that the second node N2 will be noiseless, and the transistor 102 can operate in the linear region.

If the supply voltage VCenter is shared with other functions, as may be the case with the LED system 200 of FIG. 3, the supply voltage VCenter may be noisy. Noise on VCenter can easily propagate to the second node N2 at the second voltage V2 as the LED voltage VLED is approximately constant if the LED current ILED is approximately constant.

Good rejection against noise on the second node N2 can only be achieved if the transistor 102 operates in a saturation region. In the saturation region the transistor 102 exhibits a high resistance. The high resistance prevents the propagation of noise at the second node N2 to the first node N1 and to the first voltage V1.

To operate the transistor 102 in the saturation region, either a large drain-source voltage VDS is required or a large aspect ratio is required. The large drain-source voltage VDS results in a high power loss, which decreases efficiency and can result in over-temperature issues. The large aspect ratio requires that the transistor 102 uses a large area in its implementation.

In the above example of the LDO regulator 100 with the supply voltage VCenter minus the LED voltage VLED being equal to 450 mV, it is required that a current of 0.5 A-1 A can flow through the transistor 102, where the transistor has a drain-source voltage VDS of 225 mV, without the transistor 102 entering the linear region.

Operation of the transistor 102 in the linear region requires a smaller area in its implementation and a lower power loss than operation in the saturation region. However, in the linear region, the transistor 102 exhibits a small resistance. If the transistor 102 operates in the linear region, the first voltage V1, which is a source voltage of the transistor 102 almost follows the second voltage V2, which is a drain voltage of the transistor 102, when there is a constant drain current flowing through the transistor 102. The noise at the second node N2 will therefore propagate from the second voltage V2 to the first voltage V1, which results in noise impacting the LED current ILED.

Suppose the first voltage V1 is 225 mV, and the second node N2 has a noise voltage of 25 mV as a result of the supply voltage VCenter providing an additional function, such as operating as a supply for a USB On-The-Go (OTG). A current across the resistor 104 will have a noise of approximately 25 mV/225 mV=11.1% of its nominal value.

Noise may be represented by a voltage shift dV. By way of example, if the second voltage V2 drops by the voltage shift dV, then the first voltage V1 will also drop by the voltage shift dV, which results in a decrease in the LED current ILED by dV/R1. It should be noted that in practice, the first voltage may drop by a voltage that is smaller than the voltage shift dV as a result in the drop in the LED current ILED.

Therefore, implementation of the LDO regulator 100 of FIG. 2 in the LED system 200 of FIG. 3 provides a trade-off between a large transistor 102, for example a large NMOS transistor, or a transistor with a large drain-source voltage VDS, operating in the saturation region and providing good rejection against noise, and a small transistor, for example a small NMOS transistor, operating in the linear region with large noise on the LED current ILED.

To resolve the issue of the voltage shift dV impacting the LED current ILED it is possible to increase a bandwidth of the regulation loop, such that the voltage shift dV applied to the second voltage V2 can be rapidly reflected to the gate voltage V3, which would pull the second voltage V2 back to the reference voltage Vref. However, this has large power requirements and may be unstable.

The current regulator 10 is not suitable for implementation in the LED system 200 of FIG. 3 as it requires a dynamically adjustable supply voltage VCentre based on the forward voltage of the LEDs 210, 212, 214. If the supply voltage VCentre is shared with other functions such as operating as a supply for a USB On-The-Go then the supply voltage VCentre must have a fixed value, such that voltages at the flash drive nodes FDRV1, FDRV2, FDRV3 will vary.

Figure 4:
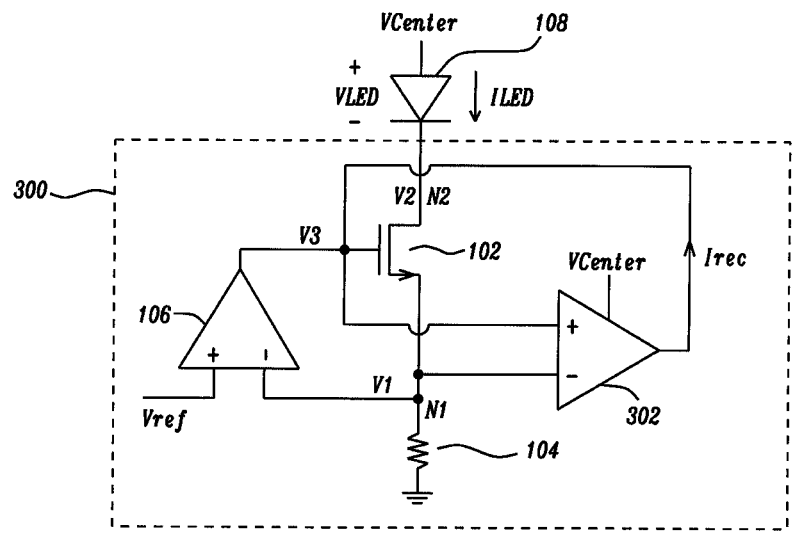
FIG. 4 is a schematic diagram of a current regulator in accordance with a first embodiment of this disclosure.

FIG. 4 is a schematic of a current regulator 300 in accordance with a first embodiment of this disclosure. FIG. 4 shares some common features with FIG. 2, as represented by common reference numerals. The current regulator 300 is for regulating a current through a circuit element, whilst maintaining a substantially constant current in the presence of noise, which was represented as the voltage shift dV previously. In FIG. 4, as for FIG. 2, the circuit element is the LED 108.

The current regulator 300 shares many features with the LDO regulator 100. For example, the current regulator 300 comprises the transistor 102 and the resistive element, implemented as the resistor 104. The source of the transistor 102 is coupled to the first terminal of the resistor 104 which corresponds to a series coupling at the first node N1 which is at the first voltage V1. The amplifier 106 has a first input coupled to the reference voltage Vref, and the second input coupled to the first node N1. The output of the amplifier 106 is coupled to a gate of the transistor 102. The LED 108 has a negative terminal coupled to a drain of the transistor 102 at the second node N2 and the positive terminal coupled to the supply voltage VCenter. Under the steady state operation, the LED current ILED can be expressed as V1/R1 where V1 is the first voltage and R1 is the resistance of the resistor 104.

The current regulator 300 comprises a main regulation loop. The main regulation loop comprises the features of the LDO regulator 100 that are present in the current regulator 300, The main regulation loop comprises the amplifier 106 with the first input coupled to the reference voltage Vref, the second input coupled to the first node N1 and the output coupled to the gate of the transistor 102. The main regulation loop further comprises the resistor 104. The main regulation loop is a negative feedback loop.

In FIG. 4, the transistor 102 is a NMOS transistor. The transistor 102 may alternatively be a PMOS transistor. The transistor 102 may be referred to as a "pass" transistor, because it is arranged to pass a supply voltage to an output voltage.

The current regulator 300 comprises a voltage to current converter 302. The first node N1 is coupled to a first input of the voltage to current converter 302 and an output of the voltage to current converter 302 is coupled to the gate of the transistor 102. The voltage to current converter 302 outputs a recovery current Irec. A second input of the voltage to current converter 302 is coupled to the gate of the transistor 102. The voltage to current converter 302 is receives the supply voltage VCenter.

In operation of the current regulator 300, if the transistor 102 is operating in the linear region and the second voltage V2 varies, for example, if the second voltage V2 decreases by the voltage shift dV, then the voltage shift dV will propagate from the second voltage V2 to the first voltage V1. This results in a decrease in the LED current ILED by dV/R1.

The decrease in the first voltage V1 by the voltage shift dV will result in an increase of the recovery current Irec that is output by the voltage to current converter 302. The recovery current Irec is injected into the gate of the transistor 102, which increases the gate voltage V3. The increase in the gate voltage V3 results in an increase of the first voltage V1, which compensates for the voltage shift dV. Consequently, the LED current ILED will return to its initial value: V1/R1, and substantially constant current will flow through the LED.

The above example has been described for a voltage shift dV leading to a decrease in the first voltage V1. It will be clear to the skilled person how the circuit will respond to an increase in the first voltage V1.

The recovery current Irec has a response time that is sufficiently fast to be able to quickly compensate for the voltage shift dV, when compared to a response time of the main regulation loop. As the recovery current Irec is generated outside of the main regulation loop its response time is not limited by the bandwidth of the main regulation loop. Additionally, a positive feedback loop is provided by coupling of the gate of the transistor 102 to the second input and the output of the voltage to current converter 302. The positive feedback loop further speeds up the response time of the recovery current Irec; the positive feedback loop continually amplifies a voltage difference between the first voltage V1 and the gate voltage V3, such that the gate voltage V3 quickly reaches a final value that results in the first voltage V1 compensating for the voltage shift dV.

The positive feedback loop also leads to the recovery current Irec increasing when the LED current ILED increases, and decreasing when the LED current ILED decreases. If the LED current ILED has a small value (for example 10 mA) then the transistor 102 will operate in the saturation region. Whilst operating in the saturation region, the first voltage V1 has good rejection against noise on the second voltage V2 and therefore it is beneficial to have a small recovery current Irec to save power. If the LED current ILED has a large value (for example 1A), then the transistor 102 will operate in the linear region, such that the first voltage V1 is susceptible to noise at the second voltage V2. In that case, the recovery current can be increased to compensate for the noise without sacrificing efficiency as long as the recovery current Irec is small compared to the LED current ILED.

Figure 5A:
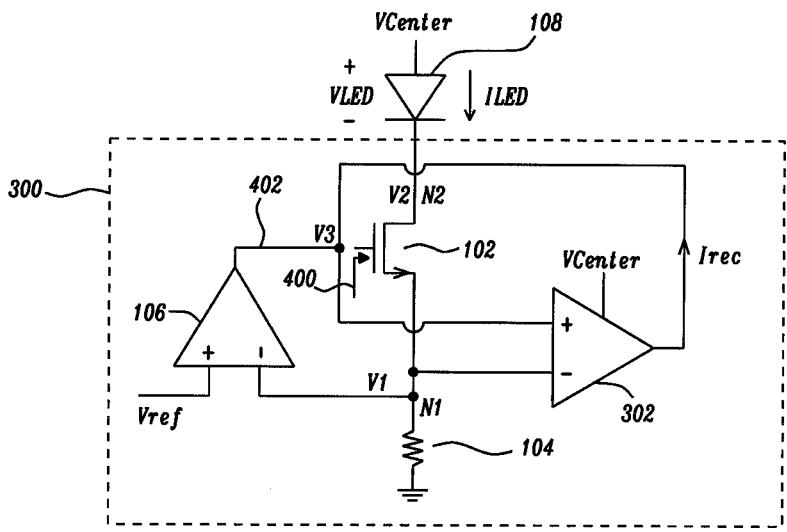
FIG. 5(a) is a schematic diagram of the current regulator of FIG. 4 with a broken positive feedback loop and a broken negative feedback loop.

To ensure stability, care must be taken when designing the positive feedback loop of the current regulator 300. The positive feedback loop provides locally a zero in a right-half-plane. FIG. 5(a) shows a schematic of the current regulator 300, with the positive feedback loop broken and the negative feedback loop broken to illustrate how stability of the positive feedback loop is analysed. In FIG. 5(a), the positive feedback loop is broken at the output of the amplifier 106. A small signal 400 is injected in the gate of the transistor 102 and a returned signal 402 is detected at the output of the amplifier 106. FIG. 5(b) shows a simulated Bode plot of the schematic shown in FIG. 5(a). The simulated Bode plot shows plurality of gain 404 and a phase 406 traces for different recovery current Irec values. The direction of the arrows 408 show the direction that the gain 404 and phase 406 shift for an increasing recovery current Irec. When the recovery current Irec increases, the gain 404 at a high frequency increases but the phase 406 decreases which implies the existence of a right-half-plane zero. A large recovery current Irec results in a fast response time, but also a small gain margin, which may lead to instability. Therefore, it is desirable to have a tunable recovery current Irec which enables the recovery current Irec to be limited such that it can be prevented from reaching a sufficiently large value that results in the current regulator 300 becoming unstable. The recovery current Irec must be tunable to maintain stability on a reference board.

Figure 6A:
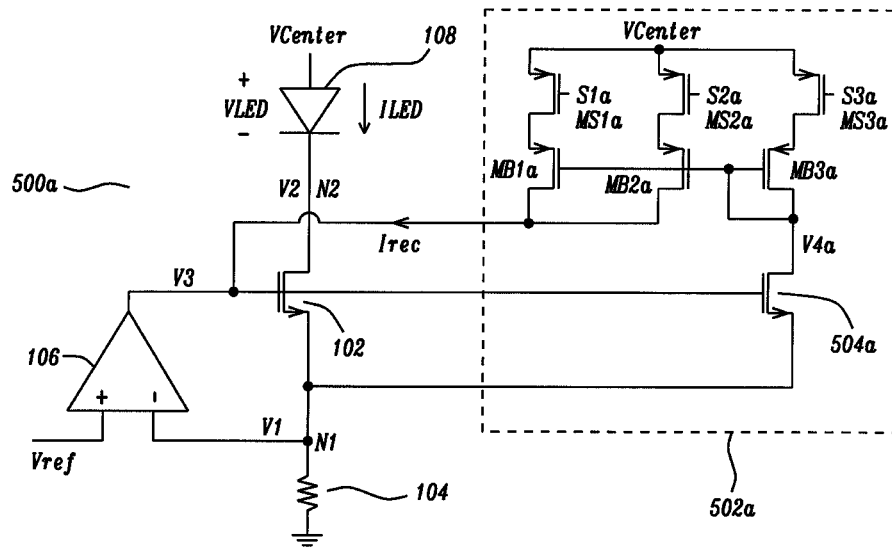
FIG. 6(a) is a schematic diagram of a current regulator in accordance with a second embodiment of this disclosure.
Figure 6B:
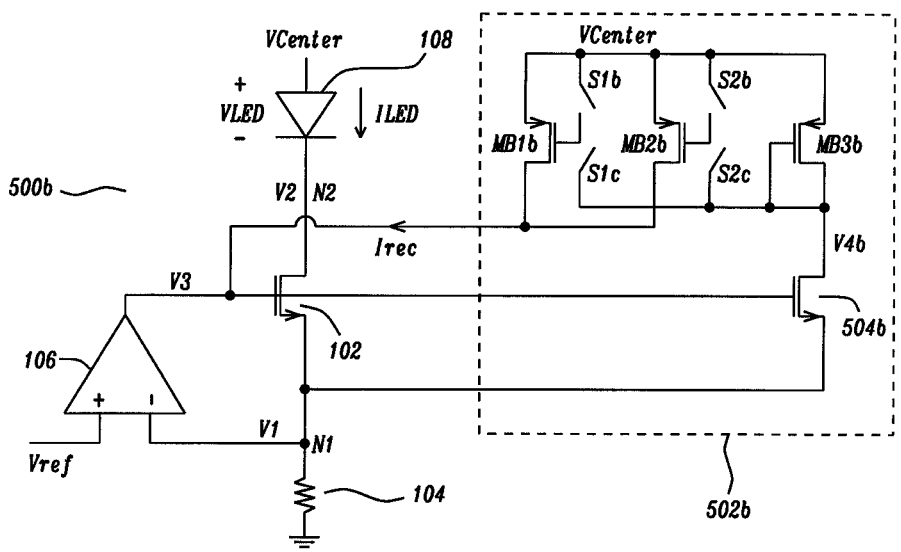
FIG. 6(b) is a schematic diagram of a current regulator in accordance with a third embodiment of this disclosure.

FIG. 6(a) shows a second embodiment of a current regulator 500a and FIG. 6(b) shows a third embodiment of a current regulator 500b in accordance with this disclosure. FIG. 6(a) and FIG. 6(b) show implementations of the current regulator 300 for providing a tunable recovery current Irec. In FIG. 6(a) and FIG. 6(b) the voltage to current converter 302 of the current converter 300 of FIG. 4 is arranged to provide a tunable recovery current Irec. FIG. 6 shares some common features with FIG. 4, as represented by common reference numerals. The tunable recovery current Irec is user controlled in the present embodiments however it will be appreciated that it would also be possible to implement a feedback mechanism.

FIG. 6(a) shows the current regulator 500a comprising a voltage to current converter 502a. The voltage to current converter 502a comprises a second transistor 504a and a plurality of switching elements MB1a, MB2a, MB3a, MS1a, MS2a, MS3a. The gate of the transistor 102 is coupled to a gate of the second transistor 504a. The source of the transistor 102 is coupled to a source of the second transistor 504a. The drain of the second transistor 504a is at a fourth voltage V4a. The fourth voltage V4a is equal to the supply voltage VCenter minus a gate-source voltage VGS-MB3a of the switching element MB3a and a drain-source voltage VDS-MS3a of the switching elements MS3a.

A current mirror is formed by the switching elements MB1a, MB2a, MB3a. The current mirror is controlled by the switching elements MS1a, MS2a, MS3a. The switching elements MS1a, MS2a, MS3a each comprise a gate. The gates of the switching elements MS1a, MS2a, MS3a are controlled by a plurality of digital switching signals S1a, S2a, S3a. The digital switching signals S1a, S2a are arranged to provide a current tuning function for the recovery current Irec. For example, if the digital switching signal S1a provides a low signal to the gate of the switching element MS1a, an MB1a branch, comprising the switching element MB1a, is turned on. If the digital switching signal S1a provides a high signal to the gate of the switching element MS1a, the MB1a branch is turned off. These operations enable a mirror ratio of the recovery current Irec to a drain current of the second transistor 504a to be changed. The digital switching signal S3a is a tie-low signal such that the switching element MS3a is always on. The switching element MS3a is provided to ensure that the MB1a branch, a MB2a branch, comprising the switching element MB2a, and a MB3a branch, comprising the switching element MB3a, match each other, in that they each have the same, or a similar, source voltage.

When the LED current ILED is large such that the second voltage V2 is small and the transistor 102 operates in the linear region, the fourth voltage V4a remains sufficiently high for the second transistor 504a to operate in a saturation region. It is necessary for the second transistor 504a to operate in the saturation region at all times because otherwise a current flowing through the second transistor 504a will decrease as the supply voltage VCenter decreases, which will adversely impact the operation of the positive feedback loop.

In operation, if the first voltage V1 drops by a first voltage shift dV1, and the second voltage V2 drops by a second voltage shift dV2, then a gate-source voltage VGS of the second transistor 504a will increase by the first voltage shift dV1 and the drain current of the second transistor 504a will increase by a second current shift dI2. The second current shift dI2 will be mirrored by the current mirror, which will increase the recovery current Irec by a first current shift dI1. The first current shift dI1 will pull up the gate voltage V3 by a third voltage shift such that a driving capability of the transistor 102 is increased. An increase in the driving capability of the transistor 102 enables it to conduct the same current with a smaller drain-source voltage VDS than prior to an increase in its driving capability. Therefore, the first voltage V1 will increase to offset the first voltage shift dV1.

FIG. 6(b) shows the current regulator 500b comprising a voltage to current converter 502b. The voltage to current converter 502b comprises a second transistor 504b and a plurality of switching elements MB1b, MB2b, MB3b, S1b, S1c, S2b, S2c. The gate of the transistor 102 is coupled to a gate of the second transistor 504ab. The source of the transistor 102 is coupled to a source of the second transistor 504b. The drain of the second transistor 504b is at a fourth voltage V4b.

The voltage to current converter 502b operates in a similar manner to the voltage current converter 502a, however in the voltage to current converter 502b, the switching elements MB1b and MB2b are selected using a different method that will be evident to the person skilled in the art. The voltage to current converter 502a requires a larger silicon area than the voltage to current converter 502b. However, in the voltage to current converter 502a, the switching elements MS1a, MS2a, MS3a can also operate as clamping resistors which enable the recovery current Irec to be limited to a bounded value, which is beneficial for maintaining stability.

Figure 7:
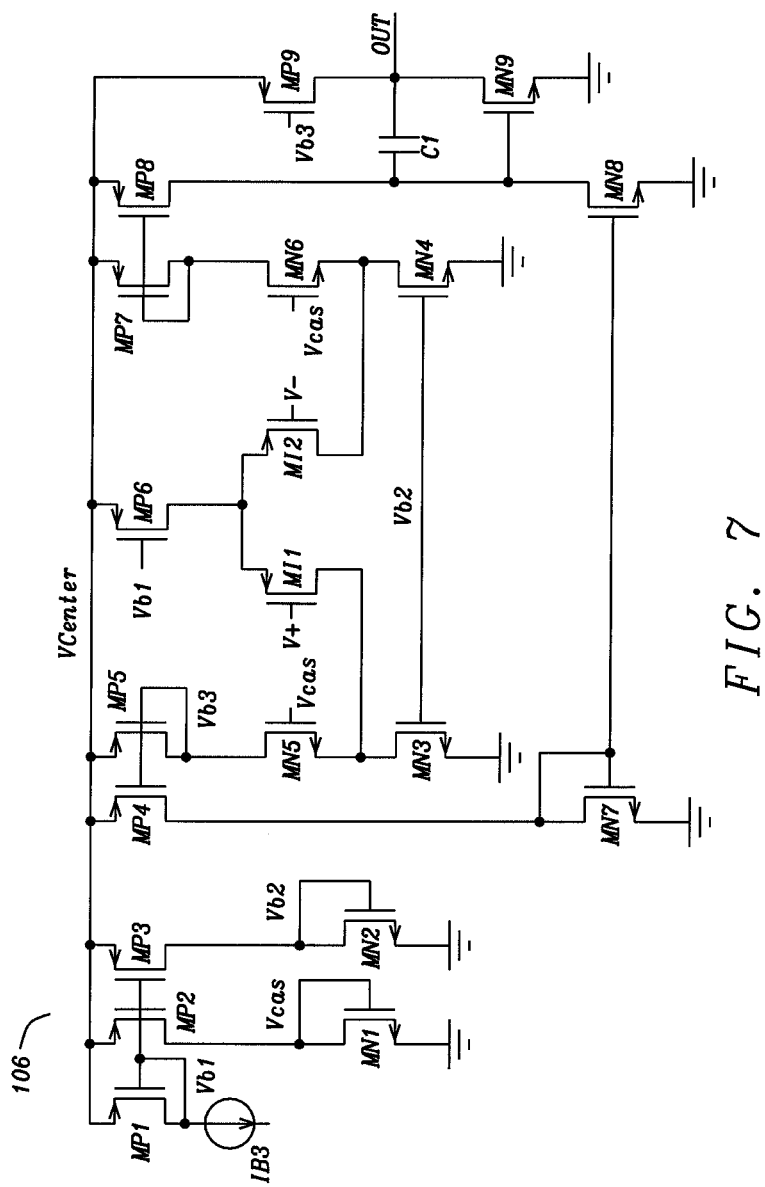
FIG. 7 is a schematic diagram of an amplifier which may be implemented in the current regulator.

FIG. 7 is a schematic of the amplifier 106 as may be implemented in FIGS. 2, 4, 5 and 6. The amplifier 106 comprises a plurality of switching elements MP1, MP2, MP3, MP4, MP5, MP6, MP7, MP8, MP9, MN1, MN2, MN3, MN4, MN5, MN6, MN7, MN8, MN9, MI1, MI2; a capacitor C1; and a current source IB3. A gate of the switching element MI1 corresponds to the first input of the amplifier 106, and a gate of the switching element MI2 corresponds to the second input of the amplifier 106. An output terminal OUT corresponds to the output of the amplifier 106.

Figure 8:
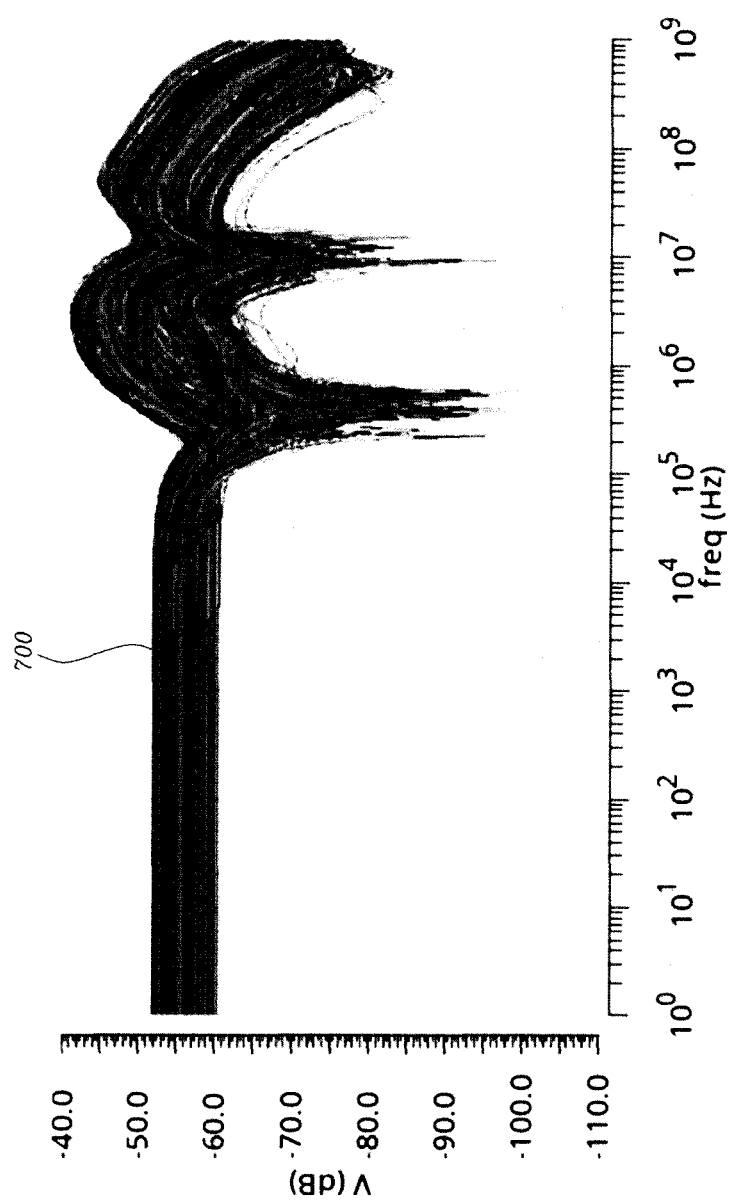
FIG. 8 shows simulation results of a power supply rejection ratio (PSRR) of the amplifier of FIG. 7.

FIG. 8 shows simulation results of a power supply rejection ration (PSRR) 700 relating to the amplifier 106 as shown in FIG. 7. Using the amplifier 106 shown in FIG. 7 in FIGS. 2, 4, 5 and 6 results in a high PSRR above 38 dB from a frequency of 1 Hz to a frequency of 1 GHz as shown in FIG. 8. The PSRR corresponds to rejection against noise on the supply voltage VCenter. For example, if PSRR=−60 dB at 1 MHz, then a 1 MHz sine wave ripple, with an amplitude of 1V on the supply voltage VCenter, will introduce a 1 mV sine wave ripple on the first voltage V1 of the current regulator 500a of FIG. 6(a).

The high PSRR implies that if the first voltage V1 is impacted by noise on the supply voltage VCenter then it must be a result of the feedback loops having a low slew rate. The slew rate relates to the response time of both the main regulation loop and the positive feedback loop, as discussed previously.

The switching element MN9 must be of a sufficient size to sink the recovery current Irec when the amplifier 106 is implemented in FIGS. 2, 4, 5 and 6. A drain current of the switching element MP9 should be as small as possible to save on power. The drain current of the switching element MP9 may for example by 100 uA.

Figure 9A:
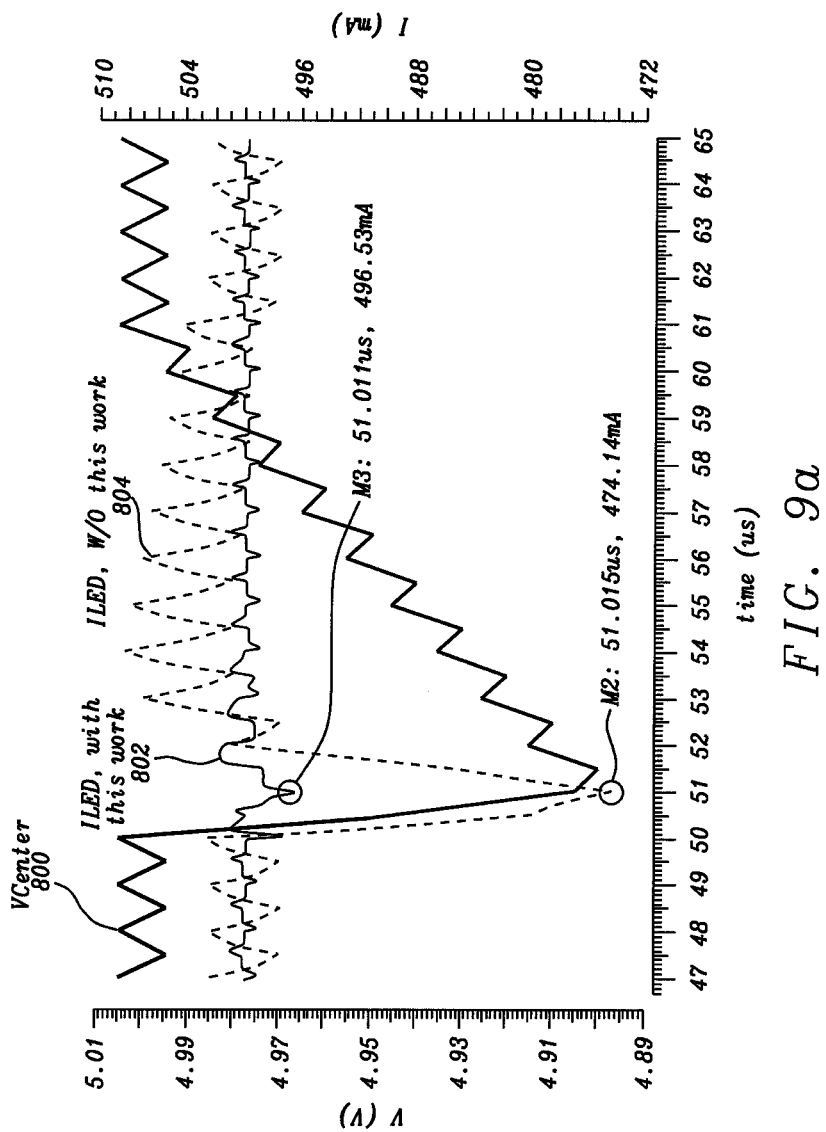
FIG. 9(a) shows simulation results of how the LDO regulator and an LED respond to a first transient condition.
Figure 9B:
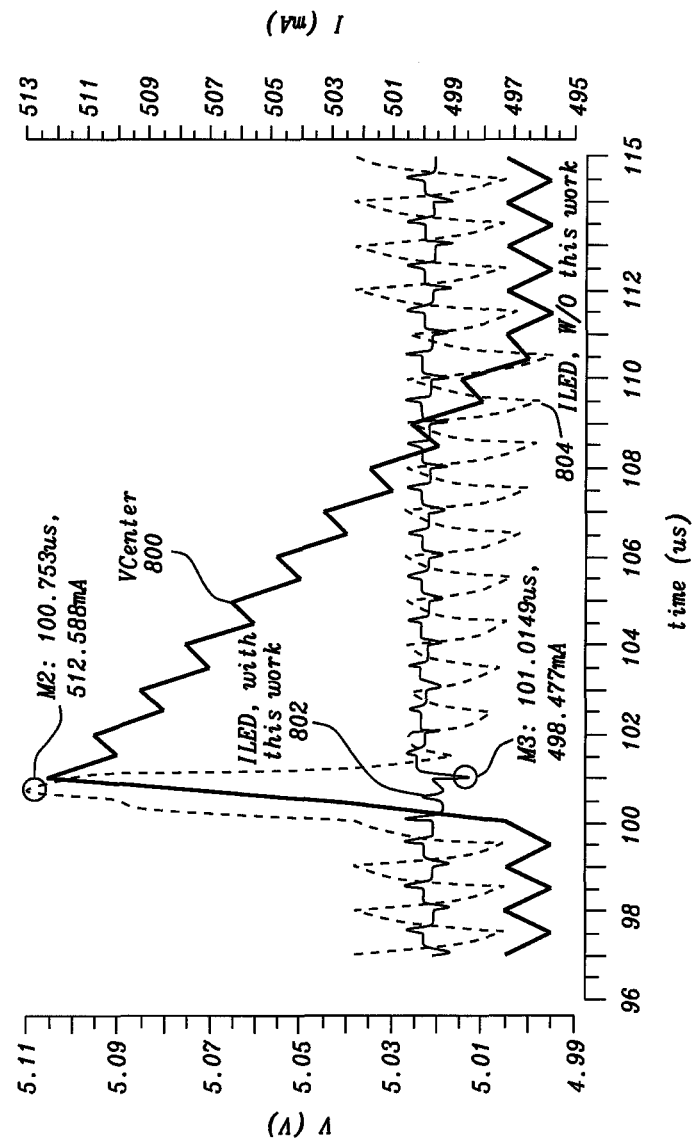
FIG. 9(b) shows simulation results of how the LDO regulator and an LED respond to a second transient condition.

FIG. 9(a) and FIG. 9(b) show simulation results of how the LDO regulator 100 with the LED 108 and the current regulator 300 with the LED 108 respond to a transient condition. In FIG. 9(a) the transient condition corresponds to a sudden decrease in the supply voltage VCenter and in FIG. 9(b) the transient condition corresponds to a sudden increase in the supply voltage VCenter.

FIG. 9(a) and FIG. 9(b) show the supply voltage VCenter 800, the LED current ILED 802 when using the current regulator 300, and the LED current ILED 804 when using the LDO regulator 100. The simulations were set up as follows: the supply voltage VCenter 800 was set to 5V, the LED voltage VLED was set to 4.4V, the reference voltage Vref was set to 355 mV and a temperature was set to 125° C. The supply voltage VCenter 800 has a ripple with a peak-to-peak voltage of 10 mV and a frequency of 1 MHz. The ripple on the supple voltage VCenter 800 results in a ripple on the LED current ILED 802 of 1.41 mA when using the current regulator 300, and a ripple on the LED current ILED 804 of 4.79 mA when using the LDO regulator 100. Therefore, the current regulator 300 reduces the ripple on the LED current ILED by approximately 70% when compared with using the LDO regulator 100.

At a time of 50 us in FIG. 9(a) there is a sudden drop in the supply voltage VCenter 800 of 100 mV. At a time of 100 us in FIG. 9(b) there is a sudden rise in the supply voltage 800 of 100 mV. This is to mimic a load transient condition as would be observed when the supply voltage VCenter also operates as the supply for a USB On-The-Go (OTG).

A variation is defined here as being the difference between a maximum value and minimum value within one of FIG. 9(a) and FIG. 9(b). For example, on FIG. 9(a) the LED current ILED 802 exhibits a variation of 5.08 mA, corresponding to the maximum LED current ILED 802 on FIG. 9(a) minus the minimum LED current ILED 802 on FIG. 9(a).

On FIG. 9(a) the LED current ILED 804 exhibits a variation of 33.75 mA. On FIG. 9(b) the LED current ILED 802 exhibits a variation of 1.97 mA and the LED current 804 exhibits a variation of 16.79 mA.

A total variation is defined here as being the difference between a maximum value and a minimum value across both FIG. 9(a) and FIG. 9(b) For example, a total variation of the LED current ILED 802 is 5.8 mA, corresponding to the maximum LED current ILED 802 of FIG. 9(a) and FIG. 9(b) minus the minimum LED current ILED 802 of FIG. 9(a) and FIG. 9(b).

A total variation of the LED current ILED 804 is 38.44 mA. Implementation of the current regulator 300 leads to a reduction on the total variation of the LED current ILED 802 of approximately 87% when compared to the LDO regulator 100 which makes the system more robust against noise on the supply voltage VCenter.

Figure 10A:
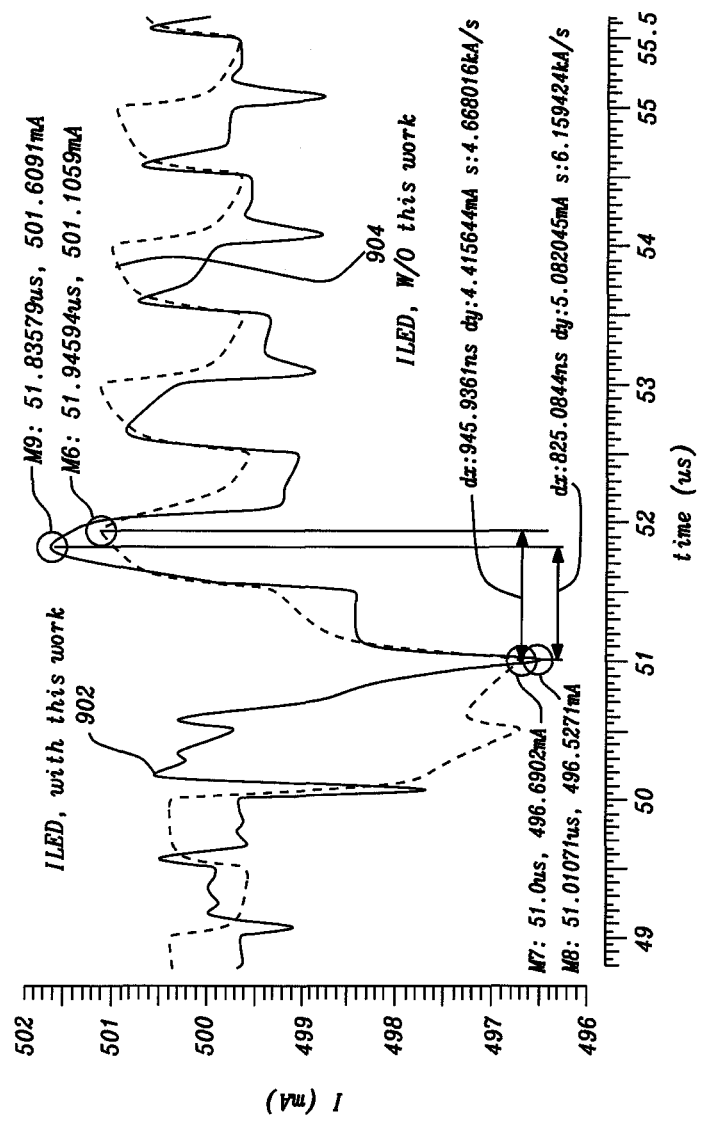
FIG. 10(a) shows a first set of simulation results for the LDO regulator and an LED, and the current regulator and an LED, for analysis of power consumption.
Figure 10B:
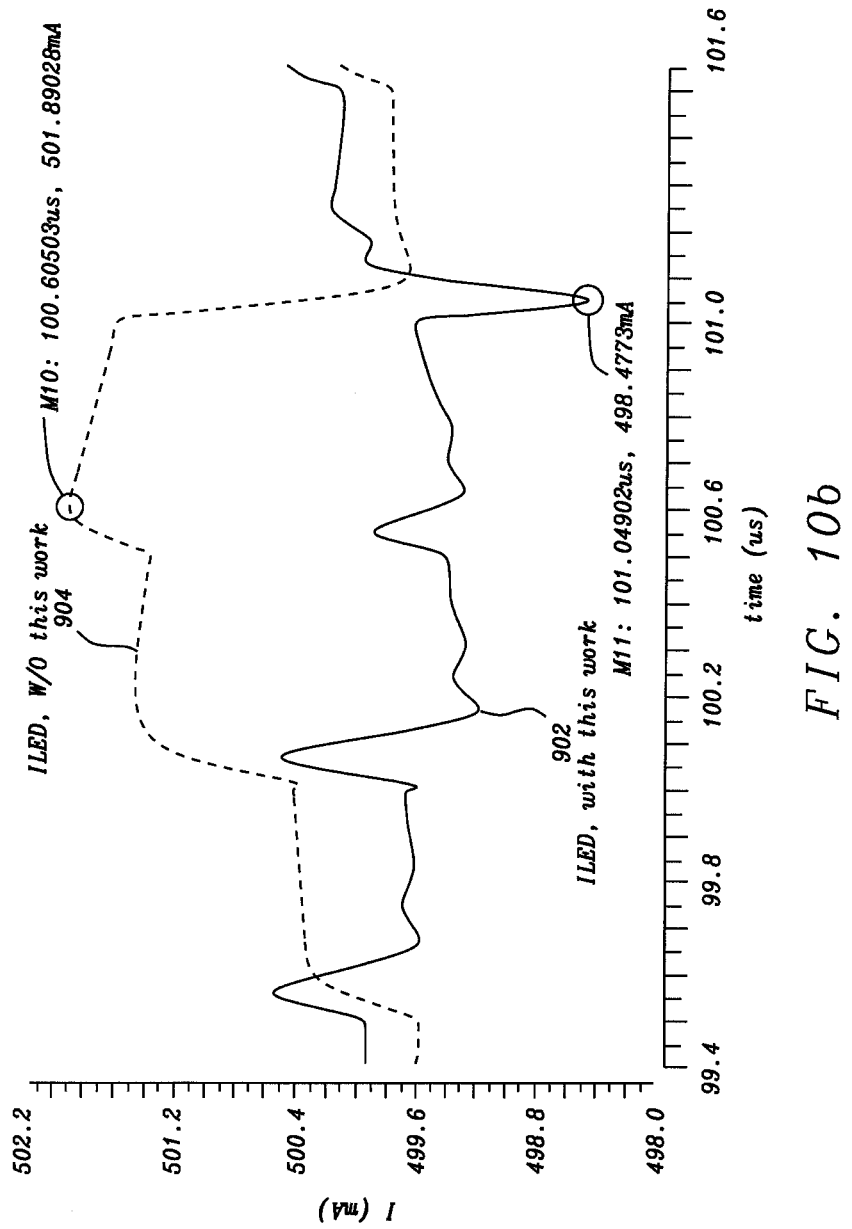
FIG. 10(b) shows a second set of simulation results for the LDO regulator and an LED, and the current regulator and an LED, for analysis of power consumption.

FIG. 10(a) and FIG. 10(b) show simulation results of the LDO regulator 100 with the LED 108 and the current regulator 300 with the LED 108. FIG. 10(a) and FIG. 10(b) show the LED current ILED 902 when using the current regulator 300, and the LED current ILED 904 when using the LDO regulator 100.

The simulation set up for FIG. 10(a) and FIG. 10(b) uses the same parameters as discussed previously for FIG. 9(a) and FIG. 9(b), however for FIG. 10 (a) and FIG. 10(b) the supply voltage VCenter used for simulating LED current ILED 902 was 5V and the supply voltage VCenter used for simulating LED current ILED 904 was 5.25V.

A total variation of the LED current ILED 902 is 5.08 mA and a total variation of the LED current ILED 904 is 5.22 mA. As the total variations are approximately equal, the current regulator 300 and the LDO regulator 100 have similar noise rejection capabilities when using the simulation set up of FIG. 10(a) and FIG. 10(b). Therefore, for the LDO regulator 100 to exhibit comparable noise rejection to that of the current regulator 300, the drain-source voltage VDS of the transistor 102 of LDO regulator 100 must be 250 mV higher than the drain-source voltage VDS of the transistor 102 of the current regulator 300.

The drain-source voltage VDS of the transistor 102 may be calculated as follows:

$$VDS = VCenter - VLED - Vref - Vtr$$

where VCenter is the supply voltage VCenter, VLED is the LED voltage VLED, Vref is the reference voltage Vref and Vtr is a voltage due to a trace resistance. For the simulation set up of FIG. 10(a) and FIG. 10(b), the transistor 102, used in the current regulator 300, has a drain-source voltage VDS calculated as follows:

$$VDS = 5V - 4.4V - 0.355V - 22\ mV = 0.223V$$

For the simulation set up of FIG. 10(a) and FIG. 10(b), the transistor 102, used in the LDO regulator 100, has a drain-source voltage VDS calculated as follows:

$$VDS = 5.25V - 4.4V - 0.355V - 22\ mV = 0.473V$$

Therefore, the power consumption of the transistor 102 is approximately 112% higher (given by (0.473V/0.223V)−1) when implemented in the LDO regulator 100, compared to its implementation in the current regulator 300.

The power consumption of the transistor 102 can be decreased by implementing the transistor 102 over a greater silicon area. Therefore, by increasing the size of the transistor 102 implemented in the LDO regulator 100, it may be operated with the same drain-source voltage VDS as the drain-source voltage VDS of the transistor 102 implemented in the current regulator 300, whilst exhibiting similar noise rejection properties. When operating in the linear region, the area occupied by the transistor is approximately inversely proportional to its drain-source voltage. Therefore, it will be required that the transistor 102 implemented in the LDO regulator 100 must be 112% larger than that transistor 102 implemented in the current regulator 300 to both have a similar drain-source voltage VDS with similar noise rejection properties.

Figure 11:
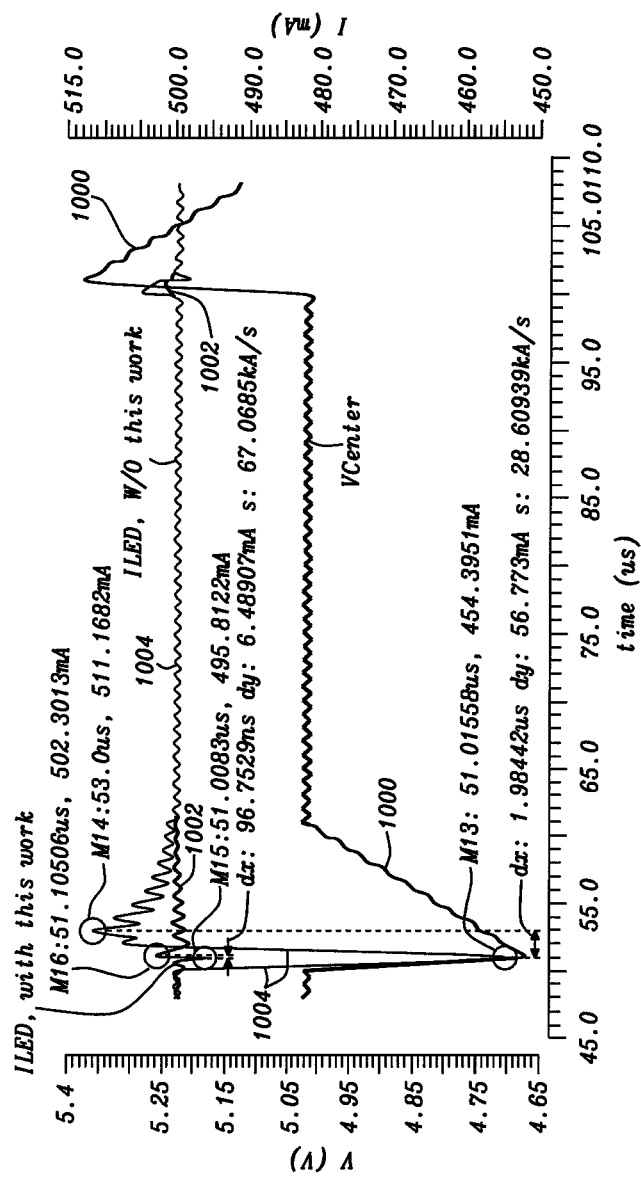
FIG. 11 shows simulation results of how the LDO regulator and an LED, and the current regulator and an LED respond to further transient conditions.

FIG. 11 shows further simulation results of the LDO regulator 100 with the LED 108 and the current regulator 300 with the LED 108. FIG. 11 shows the supply voltage VCenter 1000, the LED current ILED 1002 when using the current regulator 300, and the LED current ILED 1004 when using the LDO regulator 100. The simulation set up for FIG. 11 uses the same parameters as discussed previously for FIG. 9(a) and FIG. 9(b), however for FIG. 11 the supply voltage VCenter was 5.02V with a transient rise/fall of 350 mV, and the LED voltage VLED was 4.15V.

A total variation of the LED current ILED 1002 is approximately 6.5 mA, which is 28% larger than the total variation of the LED current ILED 802 shown in FIG. 9(a) and FIG. 9(b). A total variation of the LED current ILED 1004 is approximately 56.8 mA, which is 48% larger than the total variation of the LED current ILED 802 shown in FIG. 9(a) and FIG. 9(b). This suggests that the current regulator 300 provides greater noise rejection when the noise on the supply voltage VCenter is large.

In the current regulator 300 of FIG. 4, the recovery current Irec increases the gate voltage V3 of the transistor 102, which results in the recovery current Irec increasing further. As the main control loop has a lower bandwidth than the positive feedback loop, the main control loop would typically be understood to be unable to stabilise the positive feedback loop and prevent instability at high frequency. However, the amplifier 106, as shown in FIG. 7 is arranged to stabilise the positive feedback loop and stabilise the current regulator 300.

The amplifier 106 comprises the capacitor C1 which is coupled to a gate of the switching element MN9. The output terminal OUT is coupled to the gate of the transistor 102 of the current regulator 300. In operation, as the gate voltage V3 increases, a gate voltage of the switching element MN9 will also increase through the capacitor C1. A high frequency signal can pass through the capacitor C1, with some phase shift. This results in an increase in a driving capability of MN9, which decreases the gate voltage V3. This process results in balancing of the positive feedback loop such that the current regulator 300 remains stable.

By way of example, the operation of the switching element MN9 and the capacitor C1 may be described as follows. The capacitor C1 has a first plate coupled to a drain of the switching element MN9 and has a second plate coupled to a gate of the switching element MN9. If a first sine wave, with a frequency of 1 MHz, is applied at the drain of the switching element MN9, then the first sine wave is also applied at the first plate of the capacitor C1, this will induce charge on the second plate of the capacitor C1. Therefore, at the second plate of the capacitor C1, a second sine wave will be observed, which is a decayed and phase-shifted version of the first sine wave. The second sine wave drives the gate of the switching element MN9.

Figure 12:
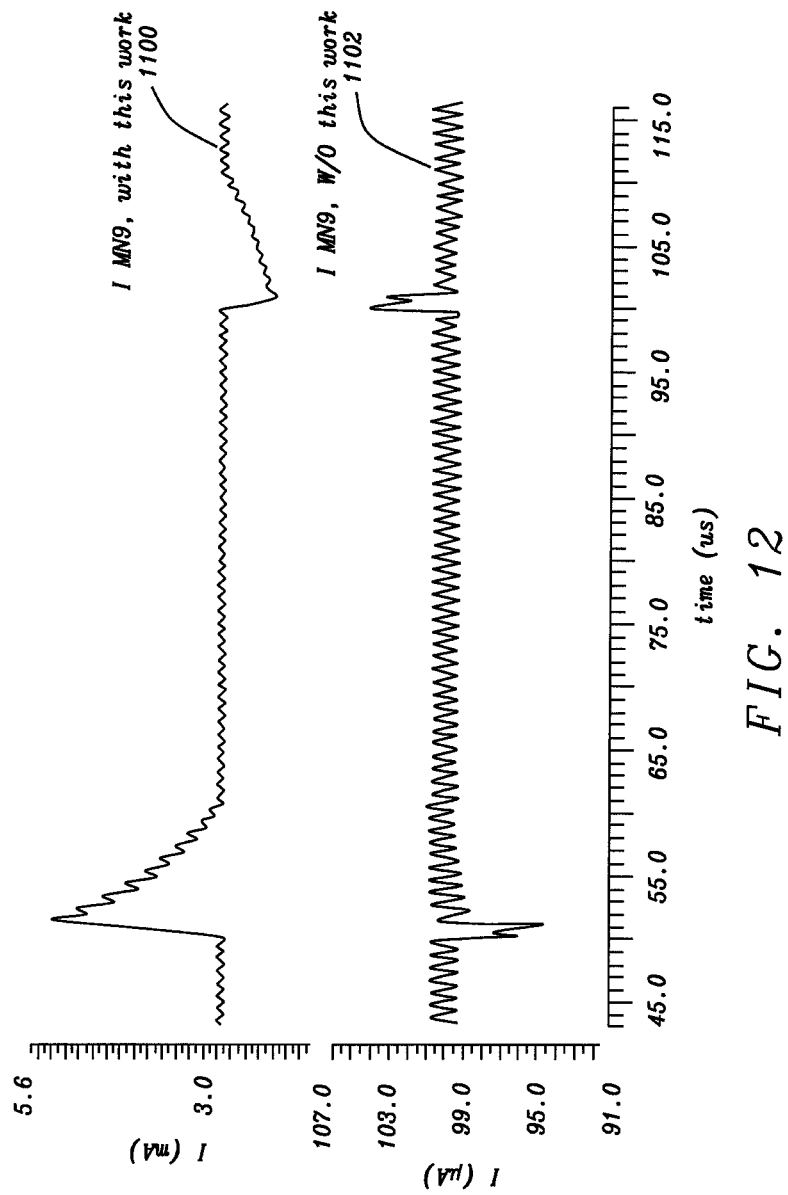
FIG. 12 shows simulation results of a current of a switching element in the LDO regulator and a current of a switching element in the current regulator during the transient conditions shown in FIG. 9(a) and FIG. 9(b)

FIG. 12 shows a current 1100 of the switching element MN9 in the current regulator 300, and a current 1102 of the switching element MN9 in the LDO regulator 100 during the simulated transient conditions shown in FIG. 9(a) and FIG. 9(b).

The current 1102, relating to the simulation of the LDO regulator 100, decreases to 95 uA in a time period from 50 us to 51 us. This is a result of a decrease in the first voltage V1, which results in a decrease in the LED current ILED during the time period, such that the current 1100 must decrease to enable the switching element MP9 to pull up the gate voltage V3.

The current 1100, relating to the simulation of the current regulator 300 increases in the time period. The increase in the current 1100 is not a result of the main control loop, as the first voltage V1 will have decreased during the time period. Therefore, the current 1100 as observed in FIG. 12 is a result of coupling through the capacitor C1 and then pulling up the gate of the switching element MN9 by the gate voltage V3.

Figure 13A:
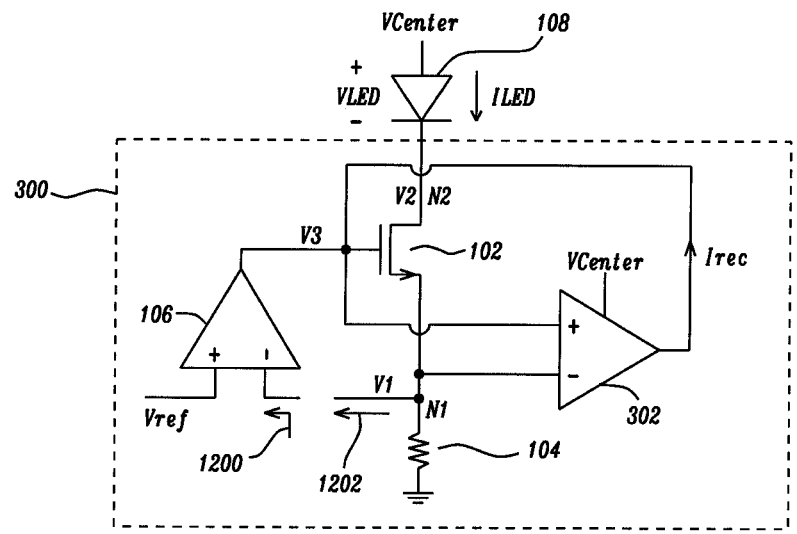
FIG. 13(a) is a schematic diagram of the current regulator of FIG. 4 with a broken main regulation loop.

FIG. 13(a) shows a schematic of the current regulator 300, with the main regulation loop broken between the first node N1 and the second input of the amplifier 106. A first small signal 1200 is injected in the second input of the amplifier 106 and a second small signal 1202 is detected at the first node N1.

Figure 13B:
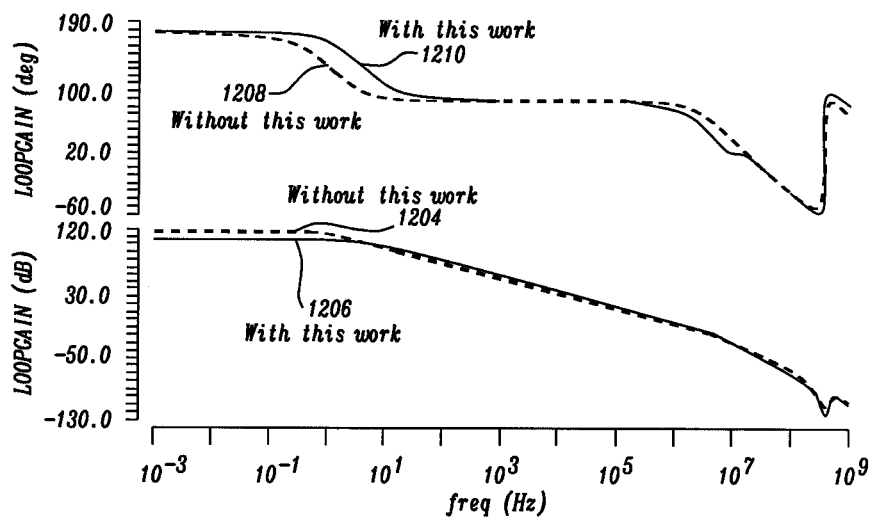
FIG. 13(b) is a simulated Bode plot of the current regulator of FIG. 13(a)

FIG. 13(b) shows a simulated Bode plot of the schematic shown in FIG. 13(a), which provides a stability analysis of the current regulator 300. Also shown is a Bode plot relating to the LDO regulator 100. The following traces are shown on FIG. 13(b): a gain 1204 of the LDO regulator 100; a gain 1206 of the current regulator 300; a phase 1208 of the LDO regulator 100; and a phase 1210 of the current regulator 300. FIG. 13(b) shows a reduction in a Miller effect of the capacitor C1. However, a phase margin of the current regulator is 77° and a gain margin of the current regulator is 46 dB and therefore the current regulator 300 is stable.

Figure 14:
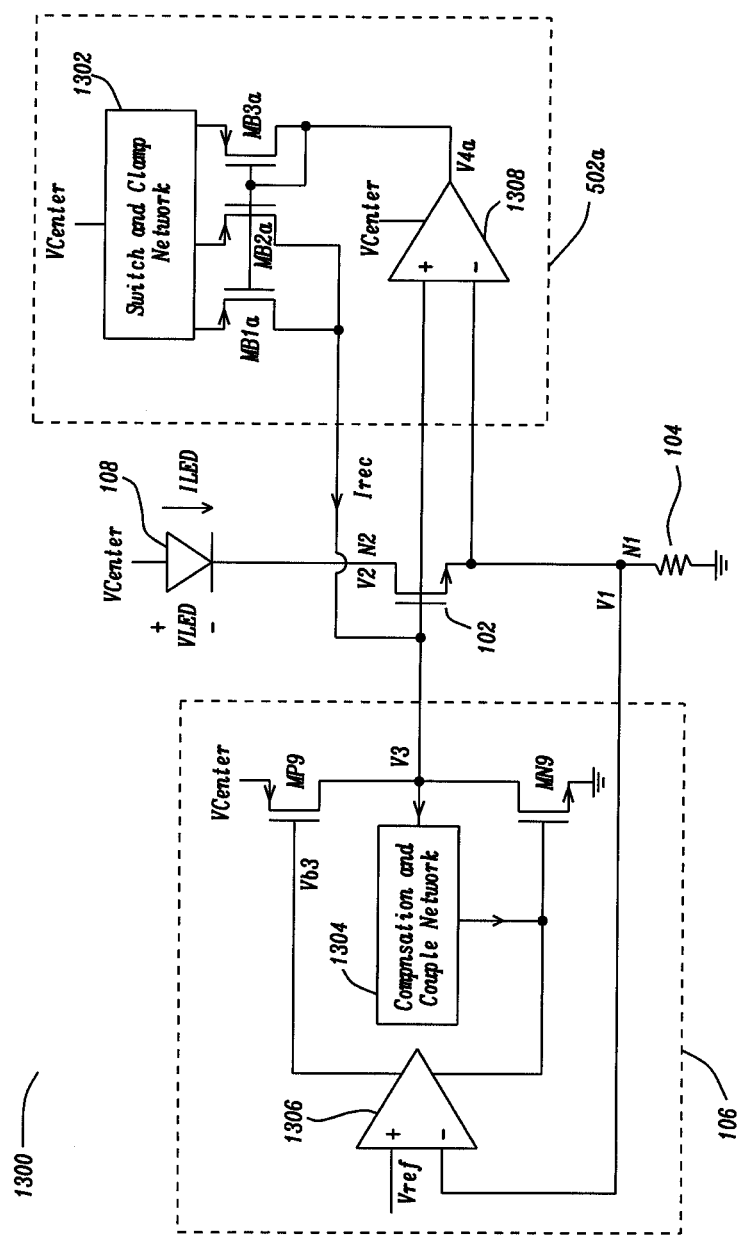
FIG. 14 is an alternative schematic diagram to the current regulator presented in FIG. 4, and incorporating elements of the amplifier of FIG. 7 and elements of a voltage to current converter of FIG. 6(a)

FIG. 14 shows a current regulator 1300, which is an alternative schematic representation of the current regulator 300 presented previously, and incorporating elements of the amplifier 106 shown in FIG. 7 and elements of the voltage to current converter 302 shown in FIG. 6(a) and represented by the voltage to current converter 502a.

The current regulator 1300 comprises a switch and clamp network 1302, a compensation and couple network 1304, an amplifier 1306 and a voltage to current converter 1308.

The switch and clamp network 1302 comprises the switching elements MS1a, MS2a, MS3a and digital switching signals S1a, S2a, S3a as shown in FIG. 6(a). The switch and clamp network 1302 enables tuning and/or limiting of the recovery current Irec, as described previously.

In FIG. 14, the voltage current converter 502a comprises the voltage to current converter 1308. The voltage to current converter 1308 may be implemented using the second transistor 504b as shown in FIG. 6(b).

The switch and clamp network 1302 is used to ensure stability under different operating conditions that may affect the positive feedback loop, such as: temperature; a noise profile of the noise on the supply voltage VCenter; a noise profile of the noise on ground; or device corners.

The compensation and couple network 1304 comprises the capacitor C1 as shown in the schematic of the amplifier 106 shown in FIG. 7. The capacitor C1 functions as described previously, such that the compensation and couple network 1304 is used to maintain stability of the current regulator 1300 at high frequencies. The compensation and couple network 1304 receives the gate voltage V3 as an input and forms a negative feedback loop to stabilise the positive feedback loop at a high frequency.

In FIG. 14, the amplifier 106 comprises the amplifier 1306, the compensation and couple network 1304, the switching element MP9 and the switching element MN9. It will be appreciated that the amplifier 1306 may be implemented using the plurality of switching elements MP1, MP2, MP3, MP4, MP5, MP6, MP7, MP8, MN1, MN2, MN3, MN4, MN5, MN6, MN7, MN8, MI1, MI2, and the current source IB3 as shown in the amplifier 106 of FIG. 7.

Figure 15:
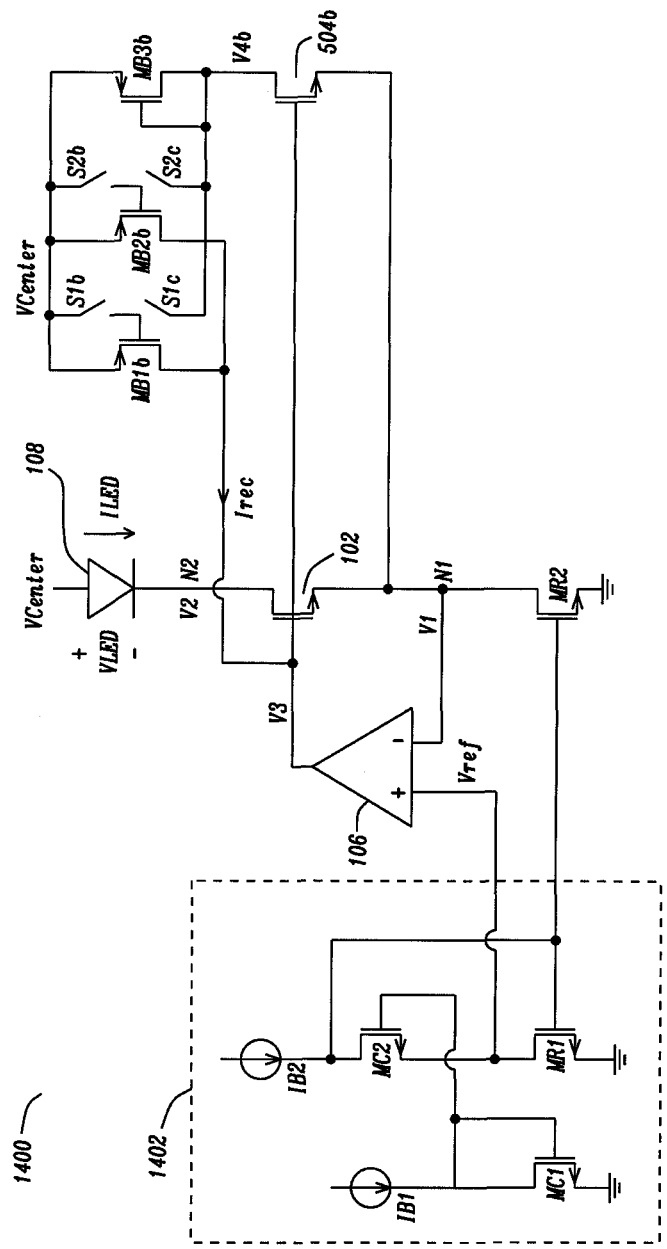
FIG. 15 is another alternative schematic diagram of the current regulator presented in FIG. 4 and incorporating elements of the voltage to current converter of FIG. 6(b) and a reference voltage generator.

FIG. 15 shows a current regulator 1400, which is an alternative schematic representation of the current regulator 300 presented previously, and incorporating elements of the voltage to current converter 302 shown in FIG. 6(b) and represented by the voltage to current converter 502b. FIG. 15 shows a possible implementation of a reference voltage generator 1402. The reference voltage generator 1402 comprises a first current source IB1, a second current source IB2, a first transistor MC1, a second transistor MC2, and a third transistor MR1. The resistive element, implemented by the resistor 104 in the current regulator 300, is implemented in the current regulator 1400 by a fourth transistor MR2.

Figure 16:
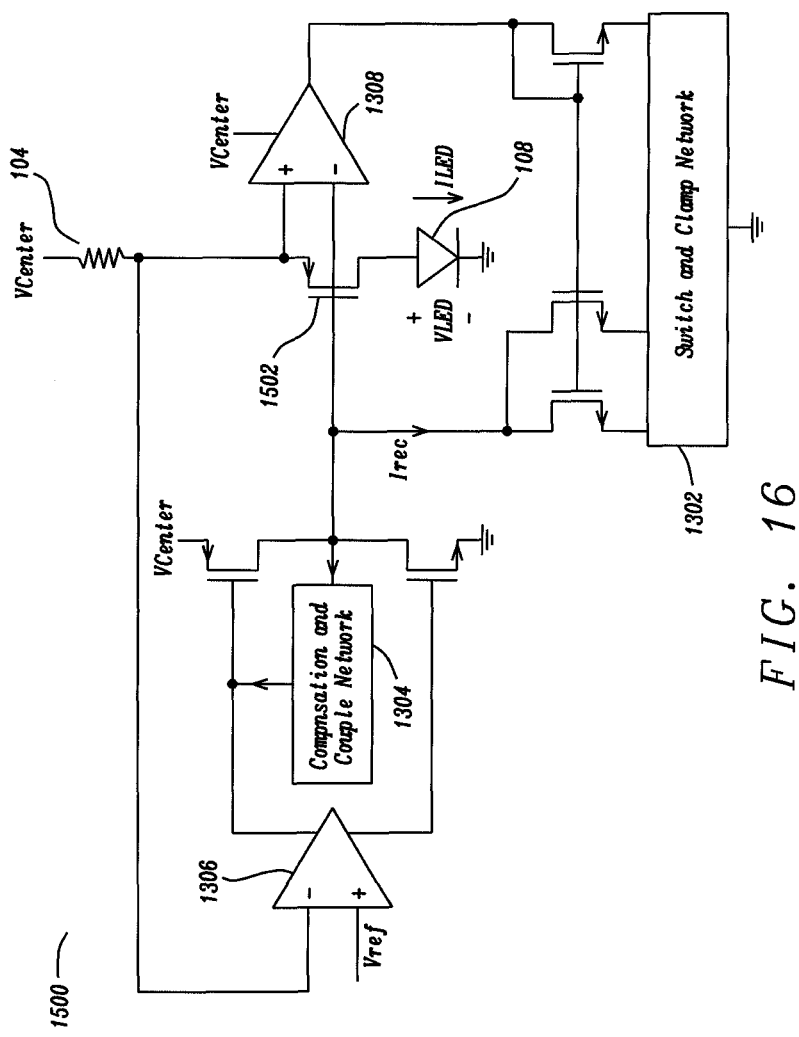
FIG. 16 is a schematic diagram of a current regulator in accordance with a fourth embodiment of this disclosure.

FIG. 16 is a schematic of a current regulator 1500 in accordance with a fourth embodiment of this disclosure. The current regulator comprises a PMOS transistor 1502, which is a type of transistor. Operation of the current regulator 1500 incorporating the PMOS transistor 1502 and the method of its implementation will be clear to skilled person considering this disclosure.

Various improvements and modifications may be made to the above without departing from the scope of the disclosure.

What is claimed is:

1. A current regulator for regulating a current through a circuit element, comprising:
a first node at a first voltage, the current through the circuit element being dependent on the first voltage;
a positive feedback loop coupled to the first node; wherein
the positive feedback loop is arranged to provide a signal to remove a voltage shift from the first voltage in response to a decrease or increase of the first voltage by the voltage shift.

2. The current regulator of claim 1, wherein the positive feedback loop comprises a voltage to current converter that is coupled to the first node at a first input and receives the first voltage at the first input, the voltage to current converter generates the signal at an output, wherein the signal is a recovery current.

3. The current regulator of claim 2, wherein the output of the voltage to current converter is coupled to a second input of the voltage to current converter.

4. The current regulator of claim 1, comprising a transistor with a gate at a gate voltage, wherein the first voltage at the first node is dependent on the gate voltage of the transistor.

5. The current regulator of claim 4, wherein the signal is received at the gate of the transistor, and upon receiving the signal, the gate voltage changes and the voltage shift is removed from the first voltage.

6. The current regulator of claim 4, comprising a resistive element coupled in series with the transistor at the first node.

7. The current regulator of claim 1, wherein the circuit element is a light emitting diode.

8. The current regulator of claim 4, wherein the circuit element has a first terminal coupled to a supply voltage and a second terminal coupled to the transistor.

9. The current regulator of claim 4, comprising a main regulation loop, the main regulation loop comprising an amplifier with a first input coupled to a reference voltage, a second input coupled to the first node and an output coupled to the gate of the transistor.

10. The current regulator of claim 8, wherein the voltage shift is propagated to the first voltage from the supply voltage.

11. The current regulator of claim 4, wherein the transistor operates in a linear region.

12. The current regulator of claim 2, wherein the recovery current is tunable.

13. The current regulator of claim 9, wherein the amplifier is arranged to stabilise the positive feedback loop.

14. The current regulator of claim 13, wherein the amplifier comprises a compensation and couple network arranged to stabilise the positive feedback loop.

15. The current regulator of claim 13, wherein the amplifier comprises a capacitor and a second transistor arranged to stabilise the positive feedback loop.

16. The current regulator of claim 12, comprising a switch and clamp network, wherein the switch and clamp network is arranged to enable tuning of the recovery current.

17. A method of providing a current regulator for regulating a current through a circuit element, comprising the steps of:
providing a first node at a first voltage, the current through the circuit element being dependent on the first voltage; and
providing a positive feedback loop coupled to the first node; wherein
the positive feedback loop is arranged to provide a signal to remove a voltage shift from the first voltage in response to a decrease or increase of the first voltage by the voltage shift.

18. The method of claim 17, wherein the positive feedback loop comprises a voltage to current converter that is coupled to the first node at a first input and receives the first voltage at the first input, the voltage to current converter generates the signal at an output, wherein the signal is a recovery current.

19. The method of claim 18, wherein the output of the voltage to current converter is coupled to a second input of the voltage to current converter.

20. The method of claim 17, comprising a transistor with a gate at a gate voltage, wherein the first voltage at the first node is dependent on the gate voltage of the transistor.

* * * * *